US011659516B2

(12) United States Patent
Cui et al.

(10) Patent No.: US 11,659,516 B2
(45) Date of Patent: May 23, 2023

(54) NETWORK-BASED USER EQUIPMENT RECEIVE/TRANSMIT CAPABILITY EXCHANGE FOR POSITIONING

(71) Applicant: Apple Inc., Cupertino, CA (US)

(72) Inventors: Jie Cui, San Jose, CA (US); Chunxuan Ye, San Diego, CA (US); Dawei Zhang, Saratoga, CA (US); Hong He, San Jose, CA (US); Manasa Raghavan, Sunnyvale, CA (US); Oghenekome Oteri, San Diego, CA (US); Seyed Ali Akbar Fakoorian, San Diego, CA (US); Weidong Yang, San Diego, CA (US); Yang Tang, San Jose, CA (US); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/348,693

(22) Filed: Jun. 15, 2021

(65) Prior Publication Data
US 2022/0086793 A1   Mar. 17, 2022

Related U.S. Application Data

(60) Provisional application No. 63/078,664, filed on Sep. 15, 2020.

(51) Int. Cl.
*H04W 64/00* (2009.01)
*H04W 24/10* (2009.01)
*H04W 8/12* (2009.01)
*H04W 8/24* (2009.01)

(52) U.S. Cl.
CPC .......... *H04W 64/006* (2013.01); *H04W 8/12* (2013.01); *H04W 8/24* (2013.01); *H04W 24/10* (2013.01)

(58) Field of Classification Search
CPC ....... H04W 64/006; H04W 8/02; H04W 8/08; H04W 8/10; H04W 8/12; H04W 8/14; H04W 8/24; H04W 24/10; G01S 5/0036; G01S 5/0236
See application file for complete search history.

(56) References Cited

U.S. PATENT DOCUMENTS

| 9,986,373 | B2 * | 5/2018 | Davydov | H04W 4/02 |
| 10,015,070 | B1 * | 7/2018 | Cai | H04W 36/00837 |
| 2005/0239480 | A1 * | 10/2005 | Kim | G01S 19/06 455/456.1 |
| 2014/0120947 | A1 * | 5/2014 | Siomina | G01S 5/0221 455/456.1 |
| 2018/0219594 | A1 | 8/2018 | Zhang et al. | |
| 2020/0045667 | A1 * | 2/2020 | Modarres Razavi | H04W 64/003 |

(Continued)

OTHER PUBLICATIONS

3GPP TSG-RAN WG3 #108-e, Change Request R3-204475, "Introduction of NR Positioning in NRPPa," Jun. 1-11, 2020, 102 pp.

(Continued)

*Primary Examiner* — Siu M Lee
(74) *Attorney, Agent, or Firm* — Kilpatrick Townsend & Stockton LLP

(57) ABSTRACT

The present application relates to devices and components including apparatus, systems, and methods to provide network-based user equipment receive/transmit capability exchange for positioning in wireless communication systems.

20 Claims, 10 Drawing Sheets

(56) References Cited

U.S. PATENT DOCUMENTS

2021/0242913 A1* 8/2021 Manolakos ............ H04B 7/043
2021/0360570 A1* 11/2021 Manolakos ........... G01S 1/0428

OTHER PUBLICATIONS

Technical Report entitled "3rd Generation Partnership Project; Technical Specification Group Radio Access Network; Study on support of reduced capability NR devices (Release 17)," 3GPP TR 38.875 V2.0.0 (Mar. 2021) in 135 pages.

Technical Specification entitled "LTE; 5G; LTE Positioning Protocol (LPP) (3GPP TS 37.355 version 16.4.0 Release 16)," ETSI TS 137 355 V16.4.0 (Apr. 2021); Reference No. RTS/TSGR-0237355vg40 in 300 pages [cited for sections 6.3, 6.5.1.7, 6.5.1.8, 6.5.3.4, 6.5.3.5, and 6.5.8-6.5.12].

Technical Specification entitled "5G; NG Radio Access Network (NG-RAN); Stage 2 functional specification of User Equipment (UE) positioning in NG-RAN (3GPP TS 38.305 version 15.0.0 Release 15)," ETSI TS 138 305 V15.0.0 (Sep. 2018); Reference No. RTS/TSGR-0238305vf00 in 57 pages.

Technical Specification entitled "5G; NG-RAN; NR Positioning Protocol A (NRPPa) (3GPP TS 38.455 version 16.3.0 Release 16)," ETSI TS 138 455 V16.3.0 (Apr. 2021); Reference No. RTS/TSGR-0338455vg30 in 151 pages [cited for sections 8.2.6, 8.2.7, 9.2.27, 9.2.28, 9.2.36, 9.2.44, and 9.2.55].

* cited by examiner

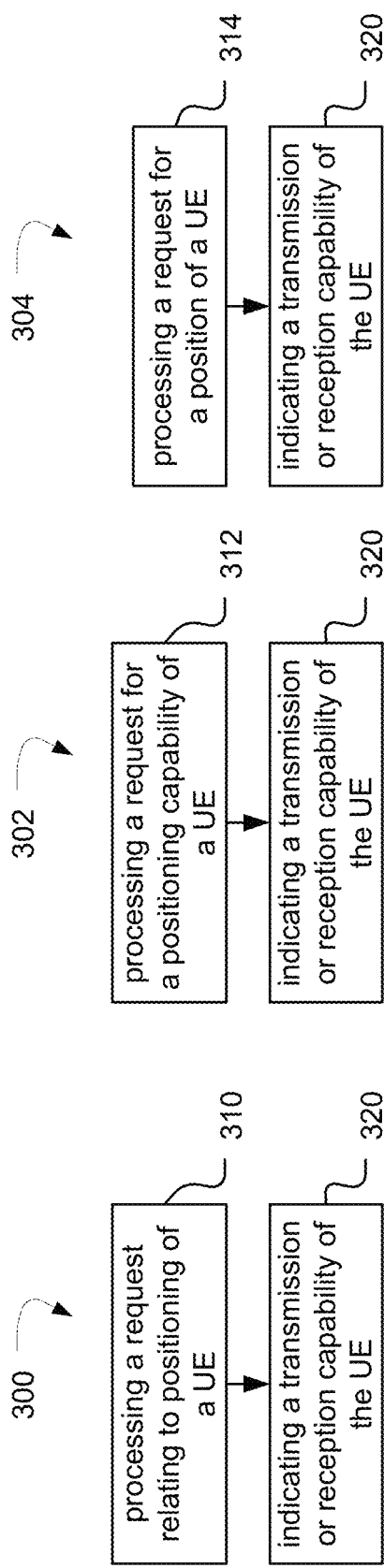
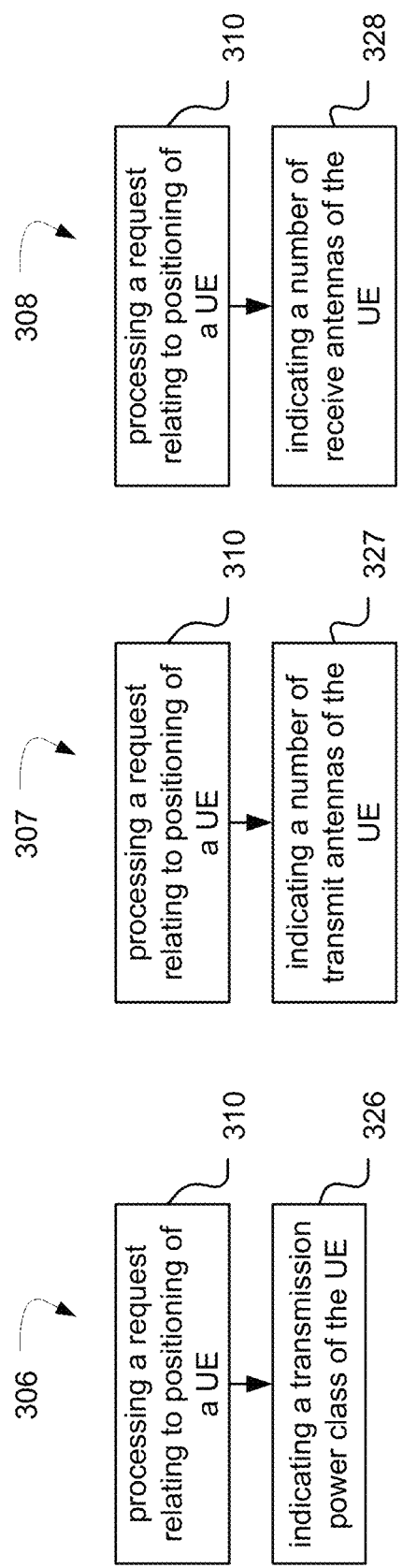

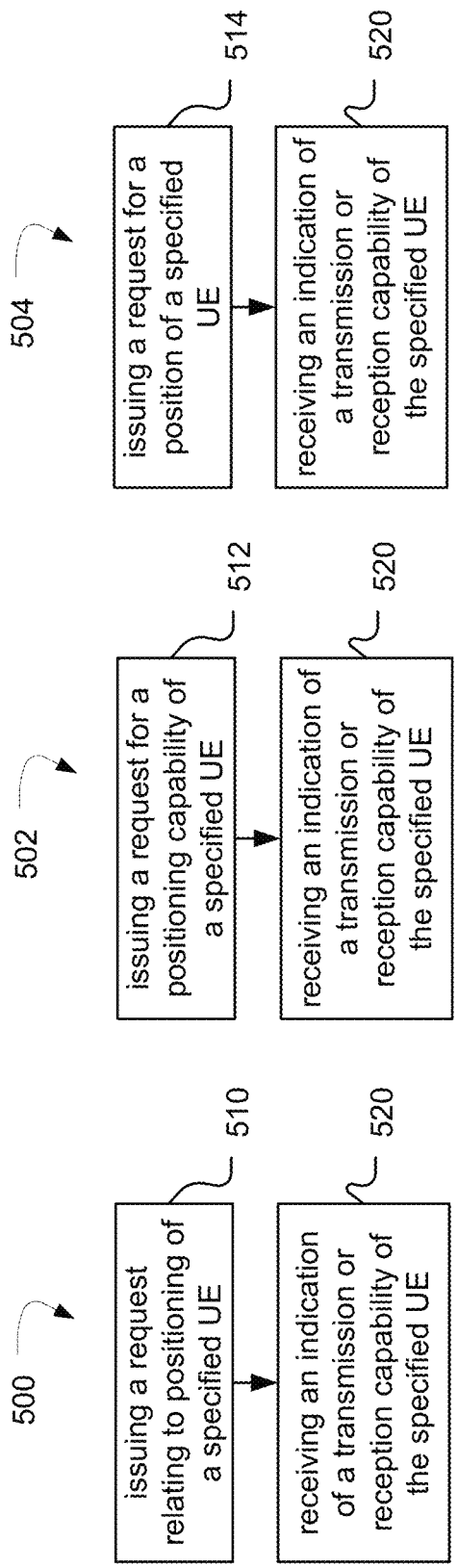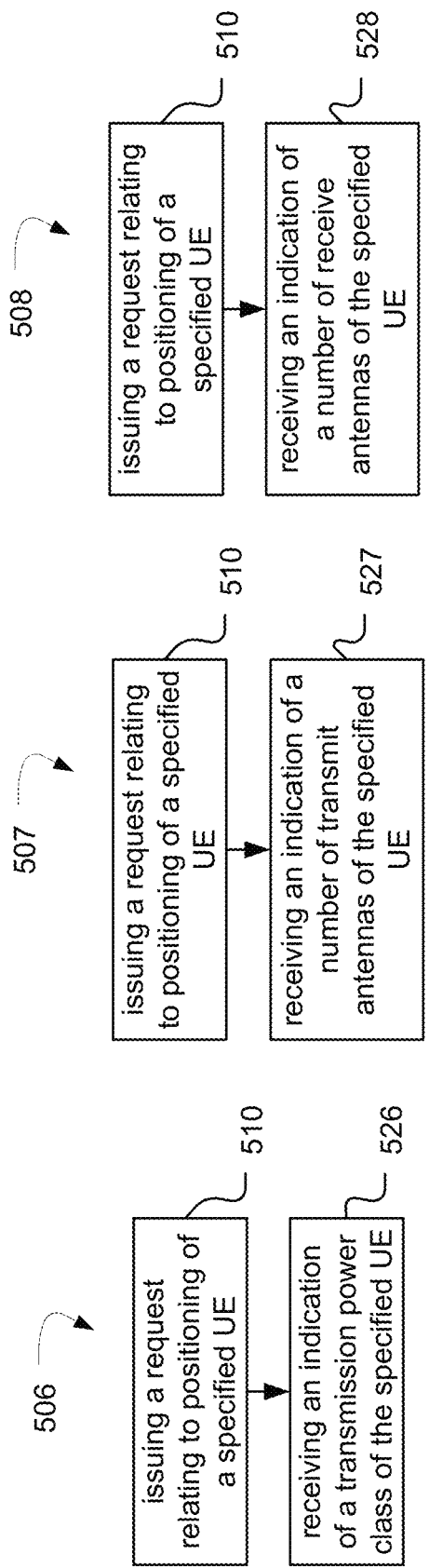

NETWORK-BASED USER EQUIPMENT RECEIVE/TRANSMIT CAPABILITY EXCHANGE FOR POSITIONING

CROSS-REFERENCES TO RELATED APPLICATIONS

This application claims the benefit of U.S. Provisional Patent Application No. 63/078,664, filed Sep. 15, 2020, which is hereby incorporated by reference in its entirety for all purposes.

BACKGROUND

A user equipment (UE) may transmit and/or receive signals from other network components for positioning measurements. A location server may communicate with network components to initiate positioning measurements.

BRIEF DESCRIPTION OF THE DRAWINGS

FIG. 3A illustrates an operational flow/algorithmic structure 300 in accordance with some embodiments.

FIG. 3B illustrates an implementation 302 of operational flow/algorithmic structure 300 in accordance with some embodiments.

FIG. 3C illustrates an implementation 304 of operational flow/algorithmic structure 300 in accordance with some embodiments.

FIG. 3D illustrates an implementation 306 of operational flow/algorithmic structure 300 in accordance with some embodiments.

FIG. 3E illustrates an implementation 307 of operational flow/algorithmic structure 300 in accordance with some embodiments.

FIG. 3F illustrates an implementation 308 of operational flow/algorithmic structure 300 in accordance with some embodiments.

FIG. 5A illustrates an operational flow/algorithmic structure 500 in accordance with some embodiments.

FIG. 5B illustrates an implementation 502 of operational flow/algorithmic structure 500 in accordance with some embodiments.

FIG. 5C illustrates an implementation 504 of operational flow/algorithmic structure 500 in accordance with some embodiments.

FIG. 5D illustrates an implementation 506 of operational flow/algorithmic structure 500 in accordance with some embodiments.

FIG. 5E illustrates an implementation 507 of operational flow/algorithmic structure 500 in accordance with some embodiments.

FIG. 5F illustrates an implementation 508 of operational flow/algorithmic structure 500 in accordance with some embodiments.

DETAILED DESCRIPTION

Figure 1:
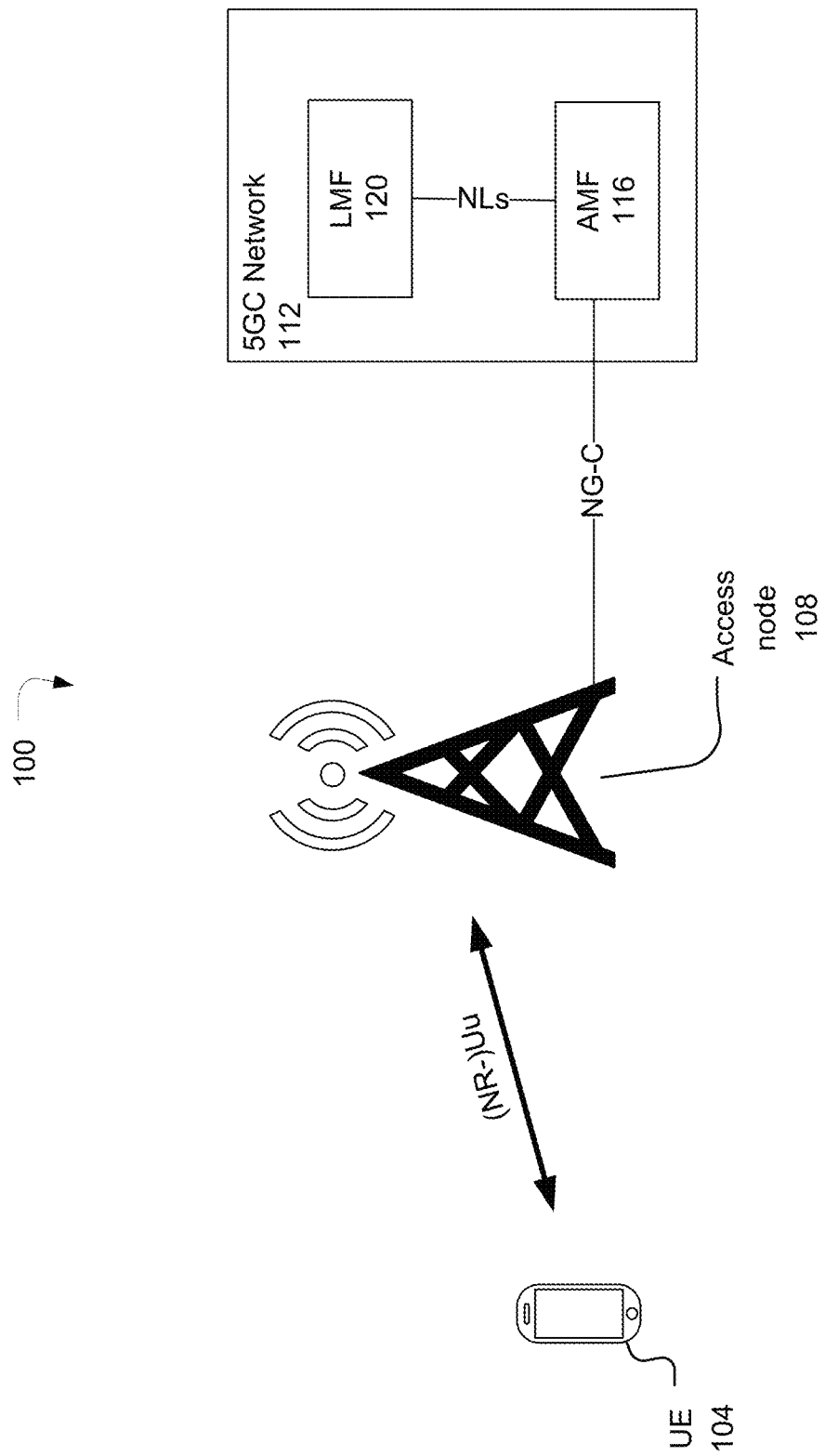
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, a baseband processor, a central processing unit (CPU), a graphics processing unit, a single-core processor, a dual-core processor, a triple-core processor, a quad-core processor, and/or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 and an access node 108.

The UE 104 may operate in accordance with, or in a manner compatible to, Long Term Evolution (LTE), or Fifth Generation (5G) New Radio (NR) system standards as provided by 3GPP technical specifications. The UE 104 may be a mobile phone, consumer electronic device, tablet computer, wearable computer device, vehicular computer device, infrastructure equipment, sensor, etc. The access node 108 may be a serving base station (e.g., a Next Generation NodeB (gNB)) that provides a wireless access cell (for example, a Third Generation Partnership Projection (3GPP) New Radio (NR) cell) through which the UE 104 may communicate with the access node 108. Other examples of access node 108 may include an eNB (evolved NodeB), an ng-eNB to provide an LTE access cell and be coupled with a 5G core (5GC) network 112, an en-gNB, or other suitable access node. The UE 104 and the access node 108 may communicate over an air interface compatible with 3GPP technical specifications such as those that define Fifth Generation (5G) New Radio (NR) system standards. For example, the access node 108 and the UE 104 may communicate with one another over an air interface that may be referred to as a Uu interface if the access cell is an LTE cell, or an NR-Uu interface if the access cell is an NR cell.

The access node 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface. The physical channels may include a physical broadcast channel (PBCH); a physical downlink control channel (PDCCH); and a physical downlink shared channel (PDSCH).

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure and for beam selection.

The PDSCH may be used to transfer end-user application data, signaling radio bearer (SRB) messages, system information messages (other than, for example, MIB), and paging messages.

The PDCCH may transfer downlink control information (DCI) that is used by a scheduler of the access node 108 to allocate both uplink and downlink resources. The DCI may also be used to provide uplink power control commands, configure a slot format, or indicate that preemption has occurred.

The access node (e.g., gNB) 108 may also transmit various reference signals to the UE 104. A reference signal is a special signal that exists only at PHY layer and is not for delivering any specific information (e.g., data), but whose purpose instead is to deliver a reference point for transmitted power. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include channel state information-reference signals (CSI-RS). The CSI-RS may be a multi-purpose downlink transmission that may be used for CSI reporting, beam management, connected mode mobility, radio link failure detection, beam failure detection and recovery, and fine tuning of time and frequency synchronization.

The access node 108 may be coupled with a core network (e.g., 5GC network 112) via a backhaul connection that may support an NG-C interface. The core network (e.g., 5GC network 112) may provide the UE 104 with various communication services. The core network (e.g., 5GC network 112) may include network elements that offer various data and telecommunications services to customers/subscribers (for example, a user of UE 104) who are connected to the core network via the access node 108. The components of the core network (e.g., 5GC network 112) may be implemented in one physical node or separate physical nodes including components to read and execute instructions from a machine-readable or computer-readable medium (for example, a machine-readable storage medium).

In some embodiments, network function virtualization (NFV) may be utilized to virtualize any or all of the above-described network node functions via executable instructions stored in one or more computer-readable storage mediums (described in further detail below). A logical instantiation of the 5GC network 112 may be referred to as a network slice, and a logical instantiation of a portion of the 5GC network 112 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more components/functions.

The access node 108 may be coupled with an access and mobility function (AMF) 116 via the NG-C interface. The AMF 116 may be responsible for registration management (e.g., for registering UE 104, etc.), connection management, reachability management, mobility management, lawful interception of AMF-related events, and access authentication and authorization. The AMF 116 may be coupled with a location management function (LMF) 120 via an NLs interface. The LMF 120 (also called a "location server") may provide assistance data and issue requests for location measurement.

The AMF 116 may send a location services request to the LMF 120 with respect to the UE 104. The location services request may be initiated by the AMF 116 or another entity.

In response to the request, the LMF 120 may transfer assistance data to the UE 104 to assist with positioning operations. The assistance data may be tailored to the type of positioning operation that is to be performed. In general, the assistance data may include information about access nodes in the vicinity of the UE 104 and reference signal parameters corresponding to reference signals transmitted by the access nodes, which form a basis for the positioning measurements. The reference signal parameters may include, for example, bandwidth, frequency, periodicity, etc. The UE 104 may perform signaling or measurements based on the assistance data/requests to provide uplink (UL) localization and/or downlink (DL) localization. Alternatively or additionally, the UE 104 may be configured to perform localization based on Global Navigation Satellite System (GNSS) signals, Wi-Fi signals, and/or Bluetooth® signals (e.g., by forwarding measurements of such signals and/or computed UE location to the location server 120).

For UL localization, the access node (e.g., gNB) 108 may measure a sounding reference signal (SRS) transmitted by the UE 104 and forward measurements of such signal to the location server (e.g., LMF) 120, which may compute a location of the UE 104 based on such measurements from several access nodes. Examples of UL localization methods may include uplink time difference of arrival (UL-TDOA), in which the access node (e.g., gNB) 108 measures the uplink relative time of arrival (UL-RTOA) and reports the measurement to the location server (e.g., LMF) 120. Examples of UL localization methods may include uplink angle of arrival (UL-AoA), in which the access node (e.g., gNB) 108 measures the uplink angle of arrival (e.g., using receive beamforming) and reports the measurement to the location server (e.g., LMF) 120.

For DL localization, the UE 104 may measure a positioning reference signal (PRS) and/or other reference signal transmitted by the access node (e.g., gNB) 108 (e.g., CSI-RS) and forward measurements of (or measurements otherwise based on) such signal(s) and/or computed UE location to the location server (e.g., LMF) 120. Examples of DL localization methods may include downlink time difference of arrival (DL-TDOA), in which the UE 104 performs a downlink reference signal time difference (DL RSTD) measurement for the PRS transmitted by the access node (e.g., gNB) 108 and for the PRS transmitted by each of one or more other access nodes (e.g., gNBs) and reports the measurements to the location server (e.g., LMF) 120. Examples of DL localization methods may include downlink angle of departure (DL-AoD), in which the UE 104 measures a downlink reference signal receive power (DL RSRP) per beam for the access node (e.g., gNB) 108 and for each of one or more other access nodes (e.g., gNBs) and reports the measurements to the location server (e.g., LMF) 120. Examples of DL localization methods may include Enhanced Cell ID (ECID or E-CID), in which the UE 104 reports to the location server (e.g., LMF) 120 such information as difference between transmit time and receive time for the access node (e.g., gNB) 108; and cell ID, RSRP, and reference signal receive quality (RSRQ) for the access node (e.g., gNB) 108 and for each of one or more other access nodes (e.g., gNBs). Examples of both UL and DL localization methods may include multi-cell round-trip time (Multi-RTT), in which, for each of the access node (e.g., gNB) 108 and one or more other access nodes (e.g., gNBs), the UE 104 and the access node (e.g., gNB) measure and report to the location server (e.g., LMF) 120 a difference between transmit time and receive time.

For OTDOA positioning, the LMF 120 may configure the UE 104 with assistance data of positioning reference signals (PRSs) of one or more access nodes in the vicinity of the UE 104. The access nodes in the vicinity of the UE 104 may include access node 108 and one or more other access nodes. Access node 108 may be the serving access node, while the other access node(s) may be neighbor access nodes. The assistance data of the PRSs, which may include timing and frequency information, may be based on information that the various access nodes provide to the LMF 120. In some embodiments, the access nodes may include base stations or transmit-receive points (TRPs)/transmit points (TPs), such as remote radio heads (RRHs) or downlink-PRS-only TPs. One access node, for example, access node 108, may control one or more TRPs/TPs to support PRS-based positioning operations.

The UE 104 may perform PRS measurements based on assistance data of the PRSs received from the LMF 120. In some embodiments, the PRS measurements may be the basis for reference signal time difference (RSTD) measurements. An RSTD measurement may include a measured time offset between PRSs from different access nodes (e.g., PRS 1 from access node 108 and one or more of PRS 2 from access node 124, PRS 3 from access node 132, and PRS 4 from access node 128). The UE 104 may then report the RSTD measurement results to the LMF 120. The LMF 120 may use a multilateration technique to determine the position of the UE 104 based on the RSTD measurements and knowledge of the locations of the access nodes transmitting the PRSs.

In some embodiments, the assistance data may be provided to the UE 104 in one or more information elements (IEs) that provide assistance data with respect to a reference cell (for example, the cell provided by serving access node 108) and one or more neighbor cells (for example, cells provided by one or more other access nodes) to support the RSTD measurements.

In these and/or other embodiments, the positioning capability information may correspond to positioning operations other than OTDOA (for example, multiple round trip time (RTT) positioning operations in which the UE determines a relative distance to an access node based on signals transmitted to and reference signals received from the access node) or reference signal measurements based on reference signals other than PRSs (for example, channel state information—reference signals (CSI-RSs) or synchronization signal block (SSB) signals). While various embodiments may be described with respect to OTDOA positioning operations based on PRSs, similar concepts may be applied to other positioning operations based on other reference signals.

It may be desired for the location server (e.g., LMF) 120 to obtain information regarding a transmission and/or reception capability of the UE 104. For example, it may be desired for the location server (e.g., LMF) 120 to determine a list of access nodes (e.g., gNBs) with which the UE 104 can communicate for positioning measurements. FIG. 2A shows an example in which a UE 204 is located among several access nodes gNB1, gNB2, gNB3, gNB4, and gNB5 which are at different distances and/or directions from the UE 204. In this example, the UE 204 transmits under a restriction of maximum nominal output power to 23 dBm (also called Power Class 3), although this value is an upper limit, and a transmission power level of a Power Class 3 UE may also be limited to another value that is less than 23 dBm for various reasons. For example, the UE 204 may be a smart phone or other Power Class 3 UE, or the UE 204 may be a legacy UE. At this power level, it can be expected that a first tier of access nodes (including the access nodes gNB1, gNB2, and gNB3) can communicate with the UE 204 for positioning measurements, but it can also be expected that the access nodes in a second tier (including the access nodes gNB4 and gNB5) are located too far away from the UE 204 to receive communications from the UE 204 for positioning measurements. For example, the access nodes gNB4 and gNB5 may be located too far away to receive an SRS transmitted by the UE 104. For instance, for the uplink positioning, due to the transmit power limitation, the uplink reference signal (e.g. positioning SRS) may only reach the first tier of gNBs in the geographic area (e.g. gNB1/2/3) but cannot reach the second tier of gNBs (e.g. gNB4/5).

Other UEs may operate under different transmit output power restrictions (e.g., in a different Power Class). For example, an Internet of Things (IoT) device, such as a remote sensor, may operate under a lower restriction (e.g., Power Class 4), while a fixed wireless device or other device whose transmitter is not held close to the user's head (e.g., a device mounted in a vehicle) may operate under a higher power restriction (e.g., Power Class 2 or Power Class 1). A UE that can operate at an uplink transmit power higher than 23 dBm may be called a High Power (or High Performance) UE (HPUE), and some HPUEs have a maximum transmit power level of 31 dBm.

Figure 2B:
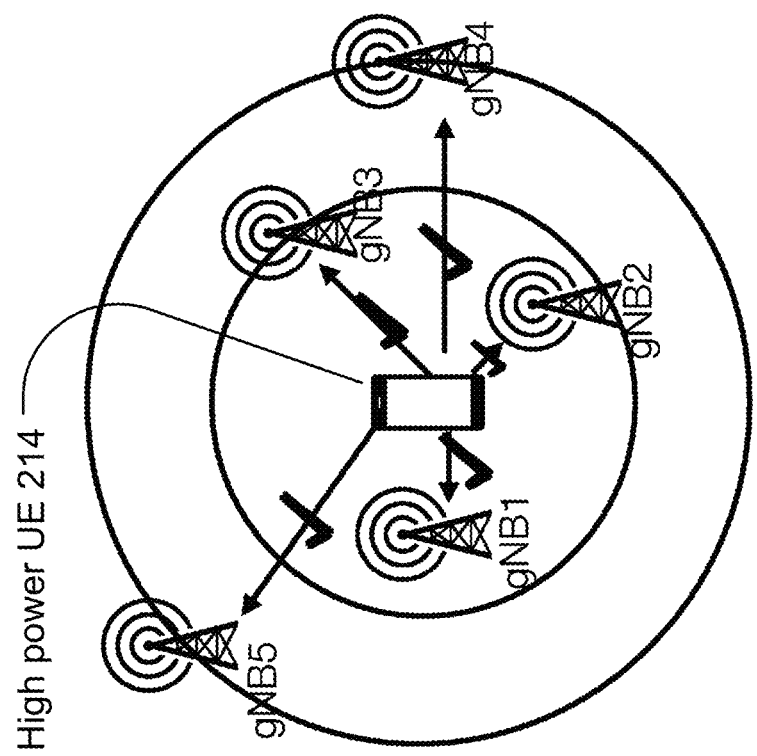
FIG. 2B shows an example in which a High Power (or High Performance) UE 214 in accordance with some embodiments is located among several access nodes.
Figure 2A:
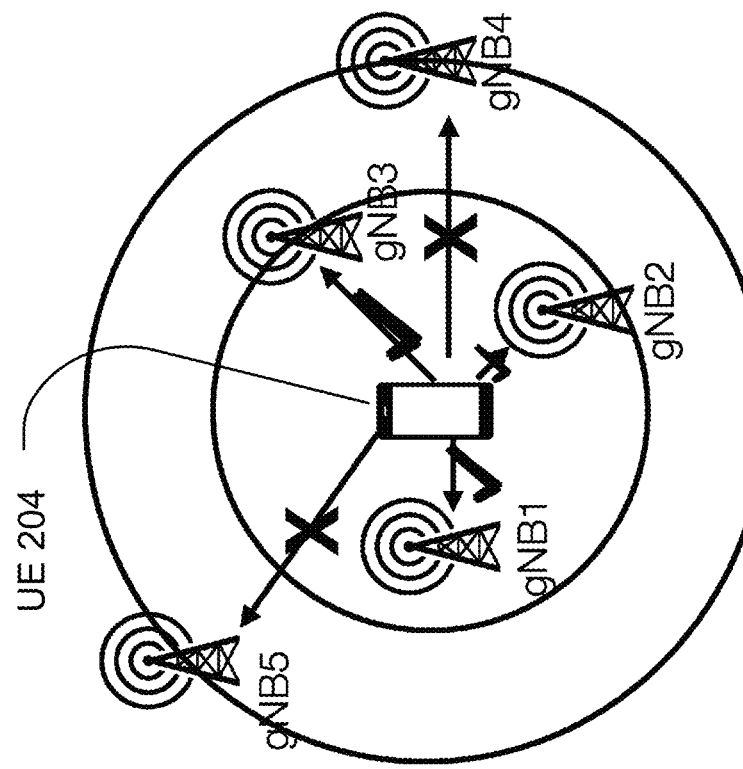
FIG. 2A shows an example in which a UE 204 in accordance with some embodiments is located among several access nodes.

FIG. 2B shows an example in which a HPUE 214 having Power Class 2 (maximum output power level of 26 dBm) is located among access nodes gNB1, gNB2, gNB3, gNB4, and gNB5 at the same location as the UE 204 in FIG. 2A. In this example, it can be expected that the access nodes in both tiers (e.g., all of gNB1, gNB2, gNB3, gNB4, and gNB5) can communicate with the HPUE 214 for positioning measurements. If HPUE 214 is configured to perform positioning in this case, the uplink coverage is probably extended to the first and second tiers of gNBs. Thus, if the location server (e.g., LMF) 120 can get such information from HPUE 214, the location server (e.g., LMF) 120 could determine the positioning gNB list easily. Information which indicates a transmission or reception capability of the UE that corresponds to a distance between the UE and an access node at which reference signals may be transmitted for positioning measurements may help the location server (e.g., LMF) 120 to determine an exact configuration of access nodes for positioning measurements of the UE 104 and/or to determine an expectation of which and/or how many access nodes may communicate with the UE 104 for positioning measurements.

The number of transmit antennas of the UE 104 is another capability of the UE 104 that corresponds to a distance between the UE 104 and the access node (e.g., gNB) 108 at which reference signals may be transmitted for positioning measurements (e.g., for UL localization). For Frequency Range 1 (FR1) (e.g., below 7.225 GHz), a transmit antenna of the UE 104 is typically implemented as an omnidirectional antenna. For Frequency Range 2 (FR2) (e.g., 24.250 GHz and above, also called mmWave), a transmit antenna of the UE 104 may be implemented as a panel having multiple antenna elements. For example, the multiple antenna elements of a panel may be driven as a phased array (e.g., to direct a beam in a desired direction). Because of diversity gain, an implementation of UE 104 that includes multiple transmit antennas (e.g., two or four transmit antennas) may be expected to transmit, for the same maximum transmit output power level, a signal having a higher power level in a particular direction than an implementation of UE 104 that includes only one transmit antenna. The implementation of UE 104 that includes multiple transmit antennas may be expected to communicate over a greater distance (e.g., via transmit beamforming) with access nodes for positioning measurements (e.g., to transmit a positioning SRS that may be received by the access node) than the implementation of UE 104 having the same maximum transmit output power level but only one transmit antenna.

The number of receive antennas of the UE 104 is also a capability of the UE 104 that corresponds to a distance between the UE 104 and the access node (e.g., gNB) 108 at which reference signals may be transmitted for positioning measurements (e.g., for DL localization). For FR1, a receive antenna of the UE 104 is typically implemented as an omnidirectional antenna. For FR2, a receive antenna of the UE 104 may be implemented as a panel having multiple antenna elements. For example, signals received by the multiple antenna elements of a panel may be combined to create a phased array (e.g., to receive a beam in a desired direction). Because of diversity gain, an implementation of UE 104 that includes multiple receive antennas (e.g., two or four receive antennas) may be capable of receiving signals from access nodes (e.g., gNBs) that are farther away than an implementation of UE 104 that includes only one receive antenna can. The implementation of UE 104 that includes multiple receive antenna elements may be expected to communicate over a greater distance (e.g., via receive beamforming) with access nodes for positioning measurements (e.g., to receive a PRS transmitted by the access node) than the implementation of UE 104 having only one receive antenna.

For the positioning function, the transmission and reception capability of UE 104 may be very important to the location server (e.g., LMF) 120. The transmission and reception capability may include, for example, the UE transmission power on UL, the number of UE transmit (Tx) antennas on UL, and/or the number of UE receive (Rx) antennas on DL.

Based on such information, the location server (e.g., LMF) 120 may determine the corresponding assistance information and/or positioning measurement for the target UE 104 with specific capability.

Communications relating to positioning of the UE 104 may be transferred between the UE 104 and the location server (e.g., LMF) 120 using the Long Term Evolution Positioning Protocol (LPP) as set forth, for example, in 3GPP Technical Specification 37.355 v16.1.0 (Jul. 24, 2020), which is a point-to-point protocol that may be used to position the target UE 104. However, LPP does not support any indication of such transmission and reception configuration/capability from the UE 104 to the location server (e.g., LMF) 120.

FIG. 3A illustrates an operational flow/algorithmic structure 300 in accordance with some embodiments. The operation flow/algorithmic structure 300 may be performed or implemented by a UE such as, for example, UE 104 or 800; or components thereof, for example, baseband processor 804A.

At 310, the operational flow/algorithmic structure 300 may include processing a request relating to positioning of the UE. Such processing may be performed by processing circuitry of the UE (for example, baseband processor 804A), and the request may be received by a transceiver of the UE (for example, RF interface circuitry 808) that may be coupled to the processing circuitry.

FIG. 3B illustrates an implementation 302 of operational flow/algorithmic structure 300 that includes an implementation 312 of operation 310 in accordance with some embodiments. At 312, the operational flow/algorithmic structure 302 may include processing a request for a positioning capability of the UE. Such a request may be implemented, for example, as an LPP RequestCapabilities message. FIG. 3C illustrates another implementation 304 of operational flow/algorithmic structure 300 that includes another implementation 314 of operation 310 in accordance with some embodiments. At 314, the operational flow/algorithmic structure 304 may include processing a request for a position of the UE. Such a request may be implemented, for example, as an LPP RequestLocationInformation message.

At 320, the operational flow/algorithmic structure 300 may include indicating, in response to the request, a transmission or reception capability of the UE that corresponds to a distance across which reference signals for positioning measurements may be communicated between the UE and an access node. Such indicating may be implemented, for example, by generating a message to provide an indication of the transmission or reception capability. Such a message may be implemented, for example, as an LPP ProvideCapabilities message. For a case in which the request processed by the UE at 310 is an LPP RequestCapabilities message containing an NR-Multi-RTT-RequestCapabilities Information Element (IE), an NR-UL-RequestCapabilities IE, an NR-ECID-RequestCapabilities IE, an NR-DL-AoD-RequestCapabilities IE, or an NR-DL-TDOA-RequestCapabdities IE, the UE may perform operation 320 by transmitting an LPP ProvideCapabilities message that contains the indication within a field of a corresponding ProvideCapabilities IE (e.g., an NR-Multi-RTT-ProvideCapabilities IE, an NR-UL-ProvideCapabilities IE, an NR-SCID ProvideCapabilities IE, an NR-DL-AoD-ProvideCapabilities IE, or an NR-DL-TDOA-ProvideCapabilities IE, respectively).

FIG. 3D illustrates an implementation 306 of operational flow/algorithmic structure 300 that includes an implementation 326 of operation 320 in accordance with some embodiments. At 326, the operational flow/algorithmic structure may include indicating a transmission power class of the UE. Such an indication may be implemented, for example, as a field in an NR-Multi-RTT-ProvideCapabilities IE in an LPP ProvideCapabilities message. Alternatively or additionally, such an indication may be implemented, for example, as a field in an NR-UL-ProvideCapabilities IE in an LPP ProvideCapabilities message. For a case in which the UE has a different transmission power class for different frequency ranges, such an indication may include an indication of the transmission power class of the UE for each frequency range, or an indication of the transmission power class of the UE for each frequency range that is indicated in the request, or an indication of the transmission power class of the UE for each frequency range in which the transmission power class of the UE is different from a default value (e.g., is different from Power Class 3, or is different from a maximum transmit output power of 23 dBm).

FIG. 3E illustrates an implementation 307 of operational flow/algorithmic structure 300 that includes an implementation 327 of operation 320 in accordance with some embodiments. At 327, the operational flow/algorithmic structure may include indicating a number of transmit antennas of the UE. Such an indication may be implemented, for example, as a field in an NR-Multi-RTT-ProvideCapabilities IE in an LPP ProvideCapabilities message. Alternatively or additionally, such an indication may be implemented, for example, as a field in a NR-UL-ProvideCapabilities IE in an LPP ProvideCapabilities message.

FIG. 3F illustrates an implementation 308 of operational flow/algorithmic structure 300 that includes an implementation 328 of operation 320 in accordance with some embodiments. At 328, the operational flow/algorithmic structure may include indicating a number of receive antennas of the UE. Such an indication may be implemented, for example, as a field in an NR-ECID-ProvideCapabilities IE in an LPP ProvideCapabilities message. Alternatively or additionally, such an indication may be implemented, for example, as a field in an NR-Multi-RTT-ProvideCapabilities IE in an LPP ProvideCapabilities message.

Alternatively or additionally, such an indication may be implemented, for example, as a field in an NR-DL-AoD-ProvideCapabilities IE in an LPP ProvideCapabilities message. Alternatively or additionally, such an indication may be implemented, for example, as a field in an NR-DL-TDOA-ProvideCapabilities IE in an LPP ProvideCapabilities message.

It is noted that any of operational flow/algorithmic structures 302 and 304 may also be implemented as operational flow/algorithmic structure 306, 307, or 308. In a further implementation of operational flow/algorithmic structure 300 (or 302 or 304), operation 320 may be implemented to include any two (e.g., 326 and 327; 326 and 328; or 327 and 328) or more of operations 326, 327, and 328.

For a case in which UE 104 is a personal device for cellular telephony (e.g., a smartphone), UE 104 will typically be of Power Class 3 (e.g., maximum nominal output power of 23 dBm). In other cases (e.g., a fixed wireless device, a device whose transmitter is mounted on or in a vehicle), UE 104 may be of a higher transmission power class (e.g., Power Class 2 or Power Class 1). It may be desired to implement UE 104 to be configurable for operation in different transmission power classes at different times. For example, it may be desired to implement UE 104 to switch from Power Class 2 to Power Class 3 (autonomously, or in response to a request from access node (e.g., gNB) 108) when the serving cell is congested, when battery power of the UE 104 is low, etc. For a case in which the UE 104 may operate in different transmission power classes at different times, the UE 104 may be implemented to perform operation 326 by indicating its highest-power transmission power class. Alternatively, for a case in which the UE 104 may operate in different transmission power classes at different times, the UE 104 may be implemented to perform operation 326 by indicating the transmission power class in which it is currently operating when operation 310 is performed or, if a request to switch power class is pending, by indicating the requested transmission power class.

Figure 4A:
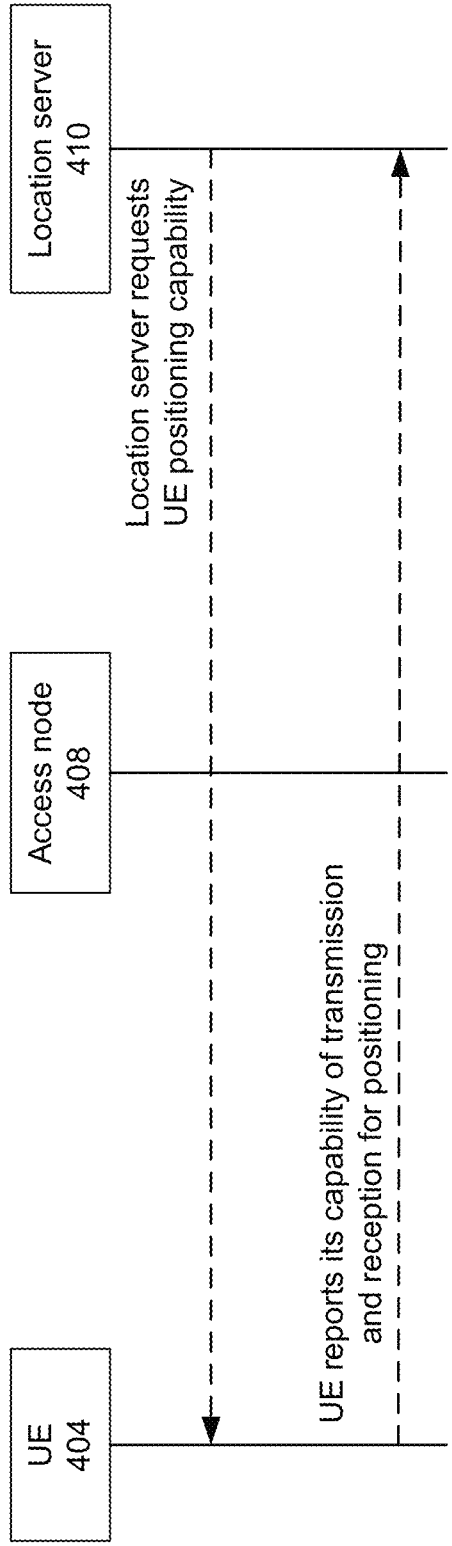
FIG. 4A illustrates a sequence diagram in accordance with some embodiments.

FIG. 4A illustrates a sequence diagram in accordance with operational flow/algorithmic structure 302. In this example, a location server (e.g., LMF) 410 transmits a request for positioning capability of a UE 404. As described above with reference to operation 310, the location server (e.g., LMF) 410 may send the request via LPP as, for example, an LPP RequestCapabilities message. The UE 404 receives the request and, in response, reports its capability of transmission and reception for positioning. As described above with reference to operation 320, the UE 404 may report its capability of transmission and reception to the location server (e.g., LMF) 410 via LPP as, for example, an LPP ProvideCapabilities message.

Figure 4B:
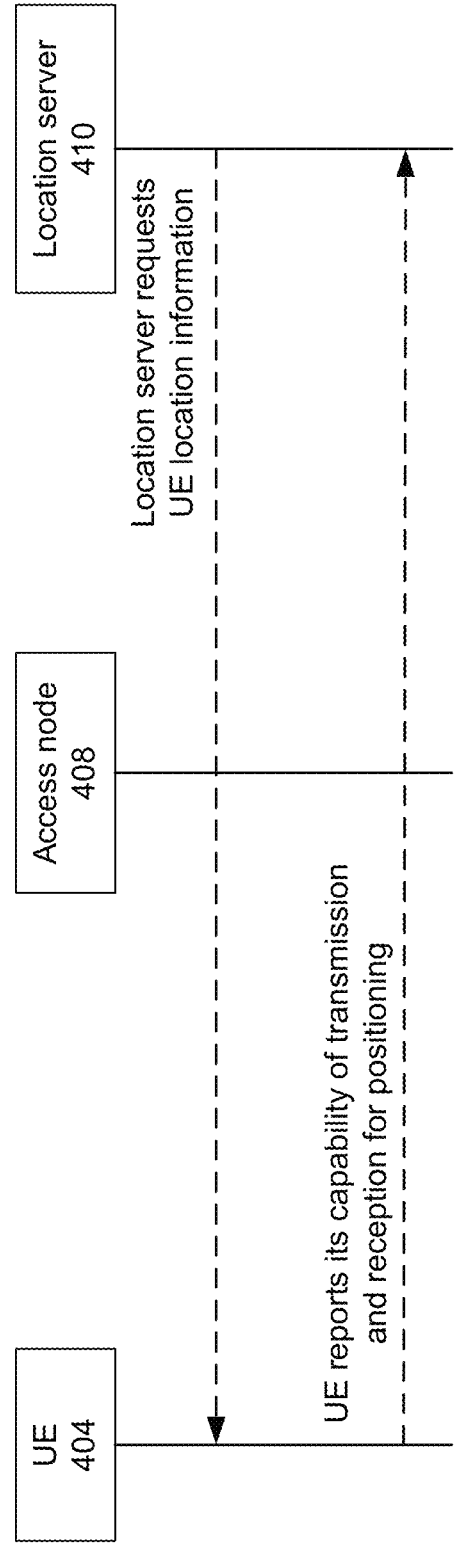
FIG. 4B illustrates a sequence diagram in accordance with some embodiments.

FIG. 4B illustrates a sequence diagram in accordance with operational flow/algorithmic structure 304. In this example, the location server (e.g., LMF) 410 transmits a request for location information of the UE 404 (e.g., a request for the UE 404 to perform a positioning measurement). As described above with reference to operation 314, the location server (e.g., LMF) 410 may send the request via LPP as, for example, as an LPP RequestLocationInformation message. The UE 404 receives the request and, in response, reports its capability of transmission and reception for positioning. For example, the UE 404 may proactively report that it has a Power Class higher than 3, a number of transmit antennas greater than one, and/or a number of receive antennas greater than one. In response to such a report, the location server (e.g., LMF) 410 may reconfigure the positioning operation: for example, by expanding the list of access nodes that communicate with UE 404 for positioning measurements. As described above with reference to operation 320, the UE 404 may report its capability of transmission and reception to the location server (e.g., LMF) 410 via LPP as, for example, an LPP ProvideCapabilities message.

FIG. 5A illustrates a operational flow/algorithmic structure 500 in accordance with some embodiments. The operation flow/algorithmic structure 500 may be performed or implemented by a location server (e.g., LMF) such as, for example, location server 120 or 1000; or components thereof, for example, baseband processor 1004A.

At 510, the operational flow/algorithmic structure 500 may include issuing a request relating to positioning of a specified UE (e.g., UE 104). Such issuing may be performed by processing circuitry (for example, baseband processor 1004A) of the location server (e.g., LMF). The issued request may be transmitted, via a network interface (for example, CN interface circuitry 1012) that may be coupled to the processing circuitry, to a serving access node (e.g., gNB) that is in communication with the specified UE.

FIG. 5B illustrates an implementation 502 of operational flow/algorithmic structure 500 that includes an implementation 512 of operation 510 in accordance with some embodiments. At 512, the operational flow/algorithmic structure 302 may include issuing a request for a positioning capability of the specified UE. Such a request may be implemented, for example, as an LPP RequestCapabilities message. FIG. 5C illustrates another implementation 504 of operational flow/algorithmic structure 500 that includes another implementation 514 of operation 510 in accordance with some embodiments. At 514, the operational flow/algorithmic structure 504 may include issuing a request for a position of the specified UE. Such a request may be implemented, for example, as an LPP RequestLocationInformation message.

At 520, the operational flow/algorithmic structure 500 may include receiving (e.g., in response to the request) an indication of a transmission or reception capability of the specified UE that corresponds to a distance across which reference signals for positioning measurements may be communicated between the specified UE and an access node. Such receiving may be implemented, for example, by receiving a message that includes an indication of the transmission or reception capability. Such a message may be implemented, for example, as an LPP ProvideCapabilities message. For a case in which the request issued by the location server (e.g., LMF) at 510 is an LPP RequestCapabilities message containing an NR-Multi-RTT-RequestCapabilities Information Element (IE), an NR-UL-RequestCapabilities IE, an NR-ECID-RequestCapabilities IE, an NR-DL-AoD-RequestCapabilities IE, or an NR-DL-TDOA-RequestCapabilities IE, the location server (e.g., LMF) may perform operation 520 by receiving an LPP ProvideCapabilities message that contains the indication within a field of a corresponding ProvideCapabilities IE.

FIG. 5D illustrates an implementation 506 of operational flow/algorithmic structure 500 that includes an implementation 526 of operation 520 in accordance with some embodiments. At 526, the operational flow/algorithmic structure may include receiving an indication of a transmission power class of the specified UE. Such an indication may be implemented, for example, as a field in an NR-Multi-RTT-ProvideCapabilities IE in an LPP ProvideCapabilities message. Alternatively or additionally, such an indication may be implemented, for example, as a field in an NR-UL-ProvideCapabilities IE in an LPP ProvideCapabilities message.

FIG. 5E illustrates an implementation 507 of operational flow/algorithmic structure 500 that includes an implementation 527 of operation 520 in accordance with some embodiments. At 527, the operational flow/algorithmic structure may include receiving an indication of a number of transmit antennas of the specified UE. Such an indication may be implemented, for example, as a field in an NR-Multi-RTT-ProvideCapabilities IE in an LPP ProvideCapabilities message. Alternatively or additionally, such an indication may be implemented, for example, as a field in a NR-UL-ProvideCapabilities IE in an LPP ProvideCapabilities message.

FIG. 5F illustrates an implementation 508 of operational flow/algorithmic structure 500 that includes an implementation 528 of operation 520 in accordance with some embodiments. At 528, the operational flow/algorithmic structure may include receiving an indication of a number of receive antennas of the specified UE. Such an indication may be implemented, for example, as a field in an NR-ECID-ProvideCapabilities IE in an LPP ProvideCapabilities message. Alternatively or additionally, such an indication may be implemented, for example, as a field in an NR-Multi-RTT-ProvideCapabilities IE in an LPP ProvideCapabilities message. Alternatively or additionally, such an indication may be implemented, for example, as a field in an NR-DL-AoD-ProvideCapabilities IE in an LPP ProvideCapabilities message. Alternatively or additionally, such an indication may be implemented, for example, as a field in an NR-DL-TDOA-ProvideCapabilities IE in an LPP ProvideCapabilities message.

It is noted that any of operational flow/algorithmic structures 502 and 504 may also be implemented as operational flow/algorithmic structure 506, 507, or 508. In a further implementation of operational flow/algorithmic structure 500 (or 502 or 504), operation 520 may be implemented to include any two (e.g., 526 and 527; 526 and 528; or 527 and 528) or more of operations 526, 527, and 528.

An example of operation of a location server (e.g., LMF) in accordance with operational flow/algorithmic structure 502 is also illustrated by the sequence diagram of FIG. 4A. In this example, a location server (e.g., LMF) 410 issues a request for positioning capability of a specified UE 404. As described above with reference to operation 510, the location server (e.g., LMF) 410 may send the request via LPP as, for example, an LPP RequestCapabilities message. In response to the request, the location server (e.g., LMF) 410 may receive an indication of the specified UE's capability of transmission and/or reception for positioning. As described above with reference to operation 520, the location server (e.g., LMF) 410 may receive the indication of the transmission and/or reception capability of the specified UE via LPP as, for example, an LPP ProvideCapabilities message.

An example of operation of a location server (e.g., LMF) in accordance with operational flow/algorithmic structure 504 is also illustrated by the sequence diagram of FIG. 4B. In this example, the location server (e.g., LMF) 410 issues a request for location information of the specified UE 404 (e.g., a request for the UE 404 to perform a positioning measurement). As described above with reference to operation 514, the location server (e.g., LMF) 410 may send the request via LPP as, for example, as an LPP RequestLocationInformation message. In response to the request, the location server (e.g., LMF) 410 may receive an indication of the specified UE's capability of transmission and/or reception for positioning. As described above with reference to operation 520, the location server (e.g., LMF) 410 may receive the indication of the transmission and/or reception capability of the specified UE via LPP as, for example, an LPP ProvideCapabilities message.

Positioning-related information may be transferred between the access node (e.g., gNB) 108 and the location server (e.g., LMF) 120 using the New Radio Positioning Protocol A (NRPPa) as set forth, for example, in 3GPP Technical Specification 38.455 v16.0.0 (Jul. 16, 2020). Such positioning-related information may include a request by the location server (e.g., LMF) 120 to activate SRS transmission by the UE 104. However, NRPPa also does not support any indication of such transmission and reception configuration/capability of the target UE 104 to the location server (e.g., LMF) 120.

Figure 6:
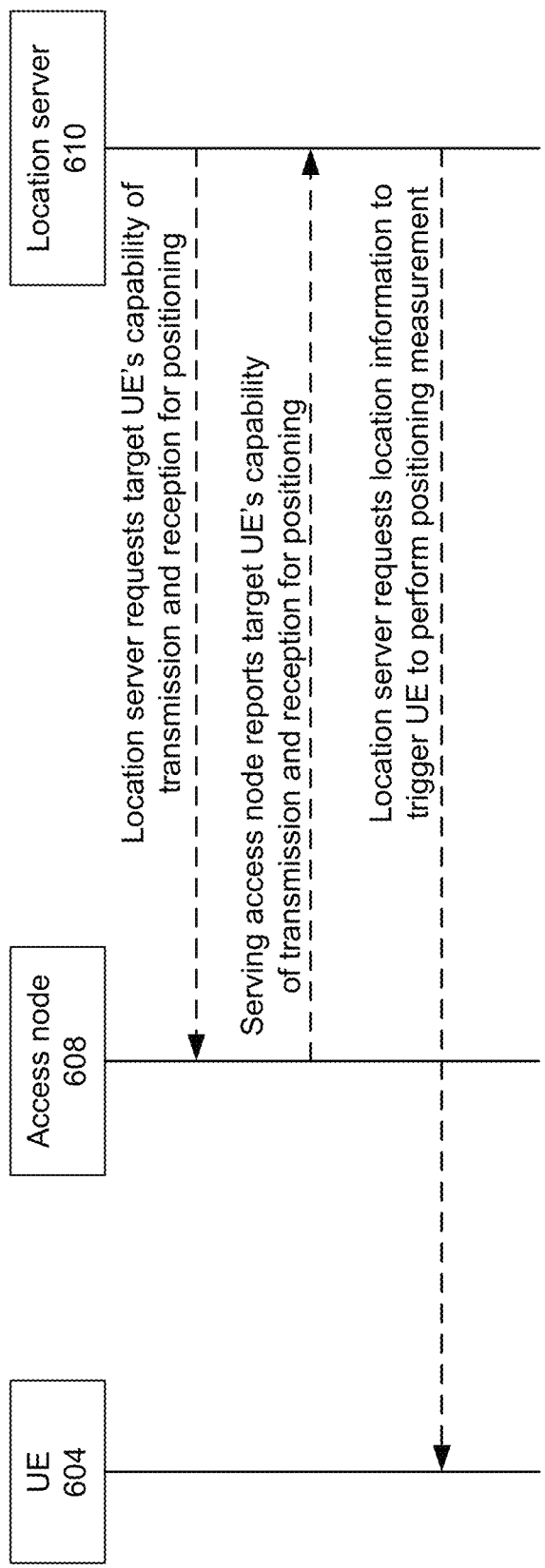
FIG. 6 illustrates a sequence diagram in accordance with some embodiments.

FIG. 6 illustrates another sequence diagram in accordance with operational flow/algorithmic structure 502. In this example, a location server (e.g., LMF) 610 performs operation 512 by issuing a request for positioning capability of a specified (target) UE 604. The location server (e.g., LMF) 610 may send the request via NRPPa in a Positioning Information Exchange Elementary Procedure (EP). For example, the location server (e.g., LMF) 610 may send the request via NRPPa in a POSITIONING INFORMATION REQUEST message (e.g., in an Information Element of such a message). In response to the request, the location server (e.g., LMF) 610 may perform operation 520 by receiving an indication of the specified UE's capability of transmission and/or reception for positioning.

For example, the serving access node (e.g., gNB) 608 may report the specified UE's capability of transmission and/or reception for positioning via NRPPa in a POSITIONING INFORMATION RESPONSE message or a POSITIONING INFORMATION UPDATE message (e.g., in an Information Element of such a message).

In the example of FIG. 6, the location server (e.g., LMF) 610 may perform a further operation by requesting location information to trigger the target UE to perform positioning measurement. The location server (e.g., LMF) 610 may perform such an operation by issuing the request for location information as, for example, an LPP RequestLocationInformation message.

Figure 7:
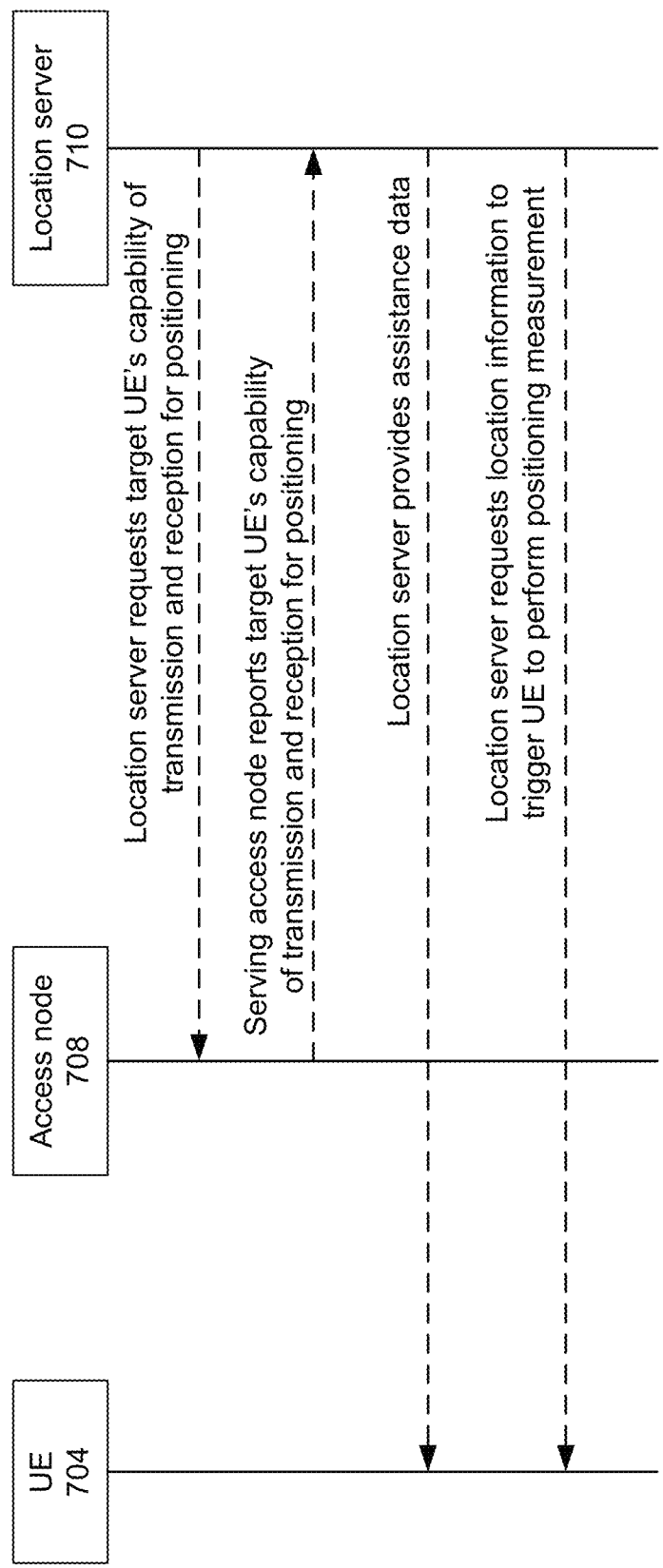
FIG. 7 illustrates a sequence diagram in accordance with some embodiments.

FIG. 7 illustrates another sequence diagram in accordance with operational flow/algorithmic structure 502. In the example of FIG. 7, the location server (e.g., LMF) 710 may perform a further operation by providing assistance data to the target UE before requesting location information. The location server (e.g., LMF) 610 may perform such an operation by issuing the assistance data in, for example, an LPP ProvideAssistanceData message.

Figure 8:
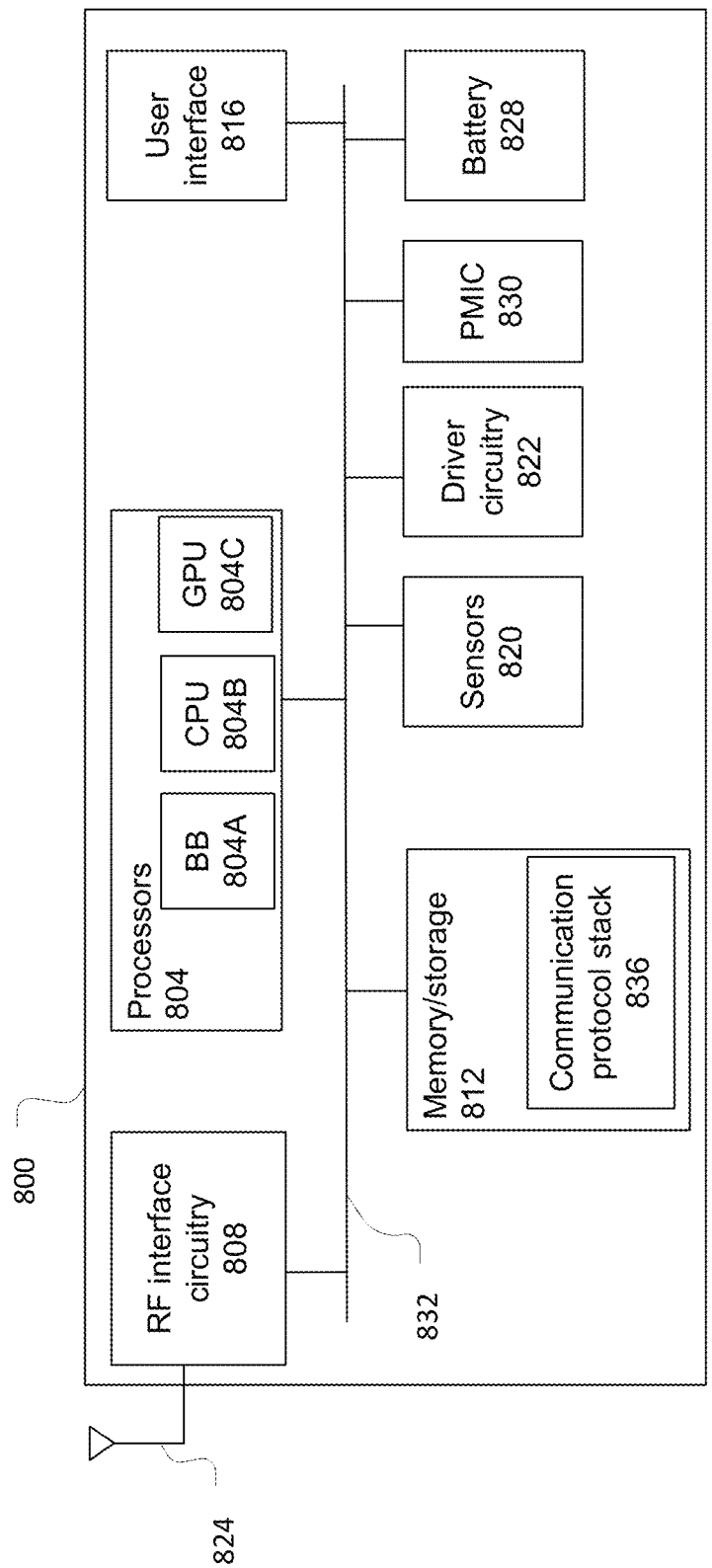
FIG. 8 illustrates a user equipment in accordance with some embodiments.

FIG. 8 illustrates a UE 800 in accordance with some embodiments. The UE 800 may be similar to and substantially interchangeable with UE 104 of FIG. 1.

Similar to that described above with respect to UE 104, the UE 800 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.) video surveillance/monitoring devices (for example, cameras, video cameras, etc.) wearable devices; relaxed-IoT devices. In some embodiments, the UE may be a reduced capacity UE or NR-Light UE.

The UE 800 may include processors 804, RF interface circuitry 808, memory/storage 812, user interface 816, sensors 820, driver circuitry 822, power management integrated circuit (PMIC) 830, and battery 828. The components of the UE 800 may be implemented as integrated circuits (ICs), portions thereof, discrete electronic devices, or other modules, logic, hardware, software, firmware, or a combination thereof. The block diagram of FIG. 8 is intended to show a high-level view of some of the components of the UE 800. However, some of the components shown may be omitted, additional components may be present, and different arrangement of the components shown may occur in other implementations.

The components of the UE 800 may be coupled with various other components over one or more interconnects 832, which may represent any type of interface, input/output, bus (local, system, or expansion), transmission line, trace, optical connection, etc. that allows various circuit components (on common or different chips or chipsets) to interact with one another.

The processors 804 may include processor circuitry such as, for example, baseband processor circuitry (BB) 804A, central processor unit circuitry (CPU) 804B, and graphics processor unit circuitry (GPU) 804C. The processors 804 may include any type of circuitry or processor circuitry that executes or otherwise operates computer-executable instructions, such as program code, software modules, or functional processes from memory/storage 812 to cause the UE 800 to perform operations as described herein.

In some embodiments, the baseband processor circuitry 804A may access a communication protocol stack 836 in the memory/storage 812 to communicate over a 3GPP compatible network. In general, the baseband processor circuitry 804A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 808.

The baseband processor circuitry 804A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 812 may include any type of volatile or non-volatile memory that may be distributed throughout the UE 800. In some embodiments, some of the memory/storage 812 may be located on the processors 804 themselves (for example, L1 and L2 cache), while other memory/storage 812 is external to the processors 804 but accessible thereto via a memory interface. The memory/storage 812 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 808 may include transceiver circuitry and radio frequency front module (RFEM) that allows the UE 800 to communicate with other devices over a radio access network. The RF interface circuitry 808 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna assembly 824 and proceed to filter and amplify (with a low-noise amplifier) the signal. The signal may be provided to a receiver of the transceiver that down-converts the RF signal into a baseband signal that is provided to the baseband processor of the processors 804.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna assembly 824.

In various embodiments, the RF interface circuitry 808 may be configured to transmit/receive signals in a manner compatible with NR access technologies.

The antenna assembly 824 may include a number of antenna elements that each convert electrical signals into radio waves to travel through the air and to convert received radio waves into electrical signals. The antenna elements may be arranged into one or more antennas (e.g., one or more panels). The antenna assembly 824 may have antenna panels that are omnidirectional, directional, or a combination thereof to enable beamforming and multiple input, multiple output communications. The antenna assembly 824 may include microstrip antennas, printed antennas fabricated on the surface of one or more printed circuit boards, patch antennas, phased array antennas, etc. The antenna assembly 824 may have one or more antennas (e.g., one or more panels) designed for specific frequency bands including bands in Frequency Range 1 (FR1) or Frequency Range 2 (FR2).

The user interface circuitry 816 includes various input/output (I/O) devices designed to enable user interaction with the UE 800. The user interface 816 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 800.

The sensors 820 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like), depth sensors, ambient light sensors, ultrasonic transceivers; microphones or other like audio capture devices; etc.

The driver circuitry 822 may include software and hardware elements that operate to control particular devices that are embedded in the UE 800, attached to the UE 800, or otherwise communicatively coupled with the UE 800. The driver circuitry 822 may include individual drivers allowing other components to interact with or control various input/output (I/O) devices that may be present within, or connected to, the UE 800. For example, driver circuitry 822 may include a display driver to control and allow access to a display device, a touchscreen driver to control and allow access to a touchscreen interface, sensor drivers to obtain sensor readings of sensor circuitry 820 and control and allow access to sensor circuitry 820, drivers to obtain actuator positions of electro-mechanic components or control and allow access to the electro-mechanic components, a camera driver to control and allow access to an embedded image capture device, audio drivers to control and allow access to one or more audio devices.

The PMIC 830 may manage power provided to various components of the UE 800. In particular, with respect to the processors 804, the PMIC 830 may control power-source selection, voltage scaling, battery charging, or DC-to-DC conversion.

In some embodiments, the PMIC 830 may control, or otherwise be part of, various power saving mechanisms of the UE 800. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 800 may power down for brief intervals of time and thus save power. If there is no data traffic activity for an extended period of time, then the UE 800 may transition off to an RRC_Idle state, where it disconnects from the network and does not perform operations such as channel quality feedback, handover, etc. The UE 800 goes into a very low power state and it performs paging where again it periodically wakes up to listen to the network and then powers down again. The UE 800 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 828 may power the UE 800, although in some examples the UE 800 may be mounted deployed in a fixed location, and may have a power supply coupled to an electrical grid. The battery 828 may be a lithium ion battery, a metal-air battery, such as a zinc-air battery, an aluminum-air battery, a lithium-air battery, and the like. In some implementations, such as in vehicle-based applications, the battery 828 may be a typical lead-acid automotive battery.

Figure 9:
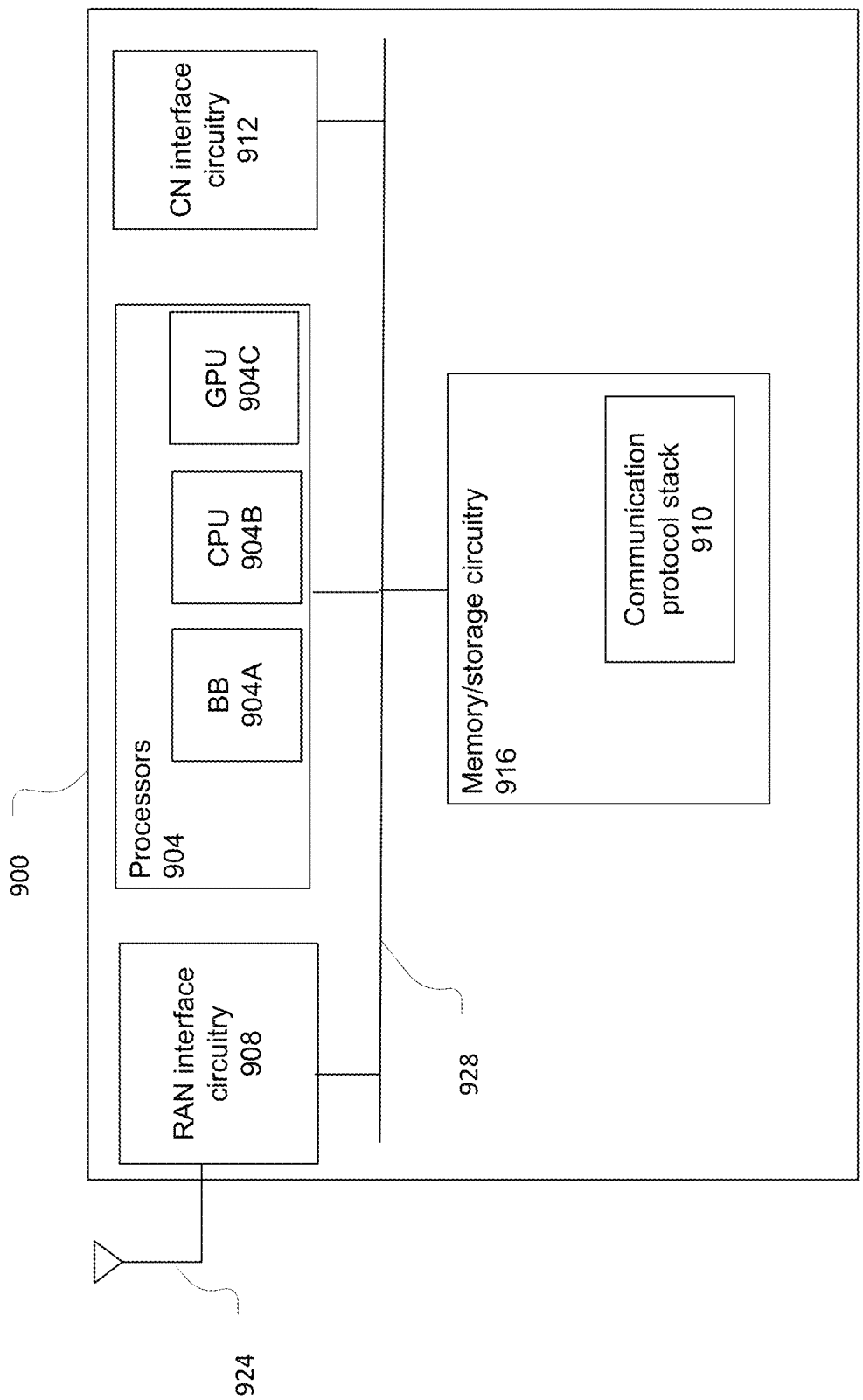
FIG. 9 illustrates an access node in accordance with some embodiments.

FIG. 9 illustrates a gNB 900 in accordance with some embodiments. The gNB node 900 may be similar to and substantially interchangeable with access node 108.

The gNB 900 may include processors 904, RF interface circuitry 908, core network (CN) interface circuitry 912, and memory/storage circuitry 916.

The components of the gNB 900 may be coupled with various other components over one or more interconnects 928.

The processors 904, RF interface circuitry 908, memory/storage circuitry 916 (including communication protocol stack 910), antenna assembly 924, and interconnects 928 may be similar to like-named elements shown and described with respect to FIG. 8.

The CN interface circuitry 912 may provide connectivity to a core network, for example, a 5th Generation Core network (5GC) using a 5GC-compatible network interface protocol such as carrier Ethernet protocols, or some other suitable protocol. Network connectivity may be provided to/from the gNB 900 via a fiber optic or wireless backhaul. The CN interface circuitry 912 may include one or more dedicated processors or FPGAs to communicate using one or more of the aforementioned protocols. In some implementations, the CN interface circuitry 912 may include multiple controllers to provide connectivity to other networks using the same or different protocols.

Figure 10:
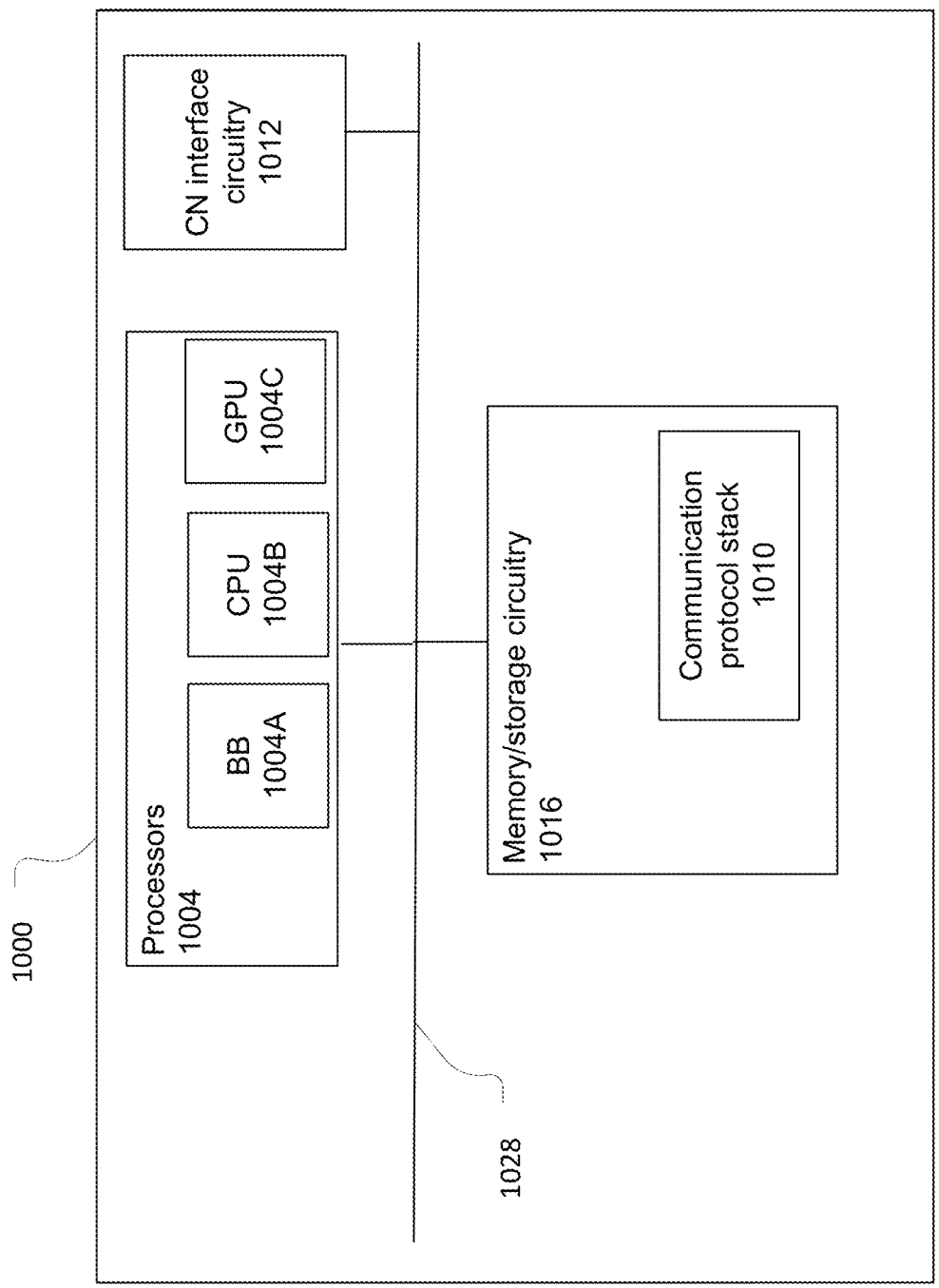
FIG. 10 illustrates a location server in accordance with some embodiments.

FIG. 10 illustrates an LMF 1000 in accordance with some embodiments. The LMF 1000 may be similar to and substantially interchangeable with location server 120.

The LMF 1000 may include processors 1004, core network (CN) interface circuitry 1012, and memory/storage circuitry 1016.

The components of the LMF 1000 may be coupled with various other components over one or more interconnects 1028.

The processors 1004, memory/storage circuitry 1016 (including communication protocol stack 1010), and interconnects 1028 may be similar to like-named elements shown and described with respect to FIG. 8.

The CN interface circuitry 1012 may provide connectivity to a core network, for example, a 5th Generation Core network (5GC) using a 5GC-compatible network interface protocol such as carrier Ethernet protocols, or some other suitable protocol. Network connectivity may be provided to/from the LMF 1000 via a fiber optic or wireless backhaul. The CN interface circuitry 1012 may include one or more dedicated processors or FPGAs to communicate using one or more of the aforementioned protocols. In some implementations, the CN interface circuitry 1012 may include multiple controllers to provide connectivity to other networks using the same or different protocols.

As described, one aspect of the present technology is the gathering and use of data available from specific and legitimate sources. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include a location server (e.g., LMF) comprising: a memory having assistance data corresponding to a plurality of access nodes; and processing circuitry coupled to the memory, the processing circuitry to: issue a request relating to positioning of a specified user equipment (UE); receive an indication of a transmission or reception capability of the specified UE with respect to reference signals transmitted for positioning measurements; select, based on the indication of a transmission or reception capability, assistance data corresponding to one or more of the plurality of access nodes; and provide the selected assistance data to the UE. The indicated transmission or reception capability may correspond, for example, to a distance between the UE and an access node at which reference signals may be transmitted for positioning measurements.

Example 2 may include the location server of example 1 or some other example herein, wherein the request relating to positioning of the specified UE comprises a request for a position of the specified UE.

Example 3 may include the location server of example 1 or some other example herein, wherein the request relating to positioning of the specified UE comprises a request for a positioning capability of the specified UE.

Example 4 may include the location server of any of examples 1 to 3 or some other example herein, wherein the transmission or reception capability of the UE comprises a transmission power class of the UE or an indication of a maximum transmit power level.

Example 5 may include the location server of any of examples 1 to 4 or some other example herein, wherein the transmission or reception capability of the UE comprises at least one of: a number of transmit antenna elements of the UE; or a number of receive antenna elements of the UE.

Example 6 may include the location server of any of examples 1 to 5 or some other example herein, wherein the request is in a Long Term Evolution Positioning Protocol (LPP) message.

Example 7 may include the location server of any of examples 1 to 6 or some other example herein, wherein the indication of a transmission or reception capability of the specified UE is in a ProvideCapabilities Information Element of a Long Term Evolution Positioning Protocol (LPP) message.

Example 8 may include the location server of any of examples 1 to 6 or some other example herein, wherein the indication of a transmission or reception capability of the specified UE is in one of a POSITIONING INFORMATION RESPONSE message of a New Radio Positioning Protocol A (NRPPa) Elementary Procedure (EP) or a POSITIONING INFORMATION UPDATE message of a NRPPa EP.

Example 9 may include the location server of any of examples 1 to 8 or some other example herein, wherein the processing circuitry is further to issue a request for uplink localization positioning measurement. The request may comprise, for example, a request to transmit a sounding reference signal (SRS).

Example 10 may include the location server of any of examples 1 to 9 or some other example herein, wherein the processing circuitry is further to issue a request for downlink localization positioning measurement. The request may comprise, for example, a request for at least one of a reference signal received power (RSRP), a reference signal received quality (RSRQ), and a timing difference.

Example 11 may include one or more computer-readable storage media having instructions that, when executed by one or more processors, cause a location server (e.g., LMF) to: issue a request relating to positioning of a specified user equipment (UE); and receive, in response to the request, an indication of a transmission or reception capability of the specified UE. The transmission or reception capability may correspond to, for example, a range across which reference signals for positioning measurements may be communicated between the specified UE and an access node.

Example 12 may include the one or more computer-readable storage media of example 11 or some other example herein, wherein the request relating to positioning of the UE comprises a request for a position of the UE.

Example 13 may include the one or more computer-readable storage media of example 11 or some other example herein, wherein the request relating to positioning of the UE comprises a request for a positioning capability of the UE.

Example 14 may include the one or more computer-readable storage media of any of examples 11 to 13 or some other example herein, wherein the transmission or reception capability of the UE comprises a transmission power class of the UE or an indication of a maximum transmit power level.

Example 15 may include the one or more computer-readable storage media of any of examples 11 to 14 or some other example herein, wherein the transmission or reception capability of the UE comprises at least one of: a number of transmit antenna elements of the UE; or a number of receive antenna elements of the UE.

Example 16 may include the one or more computer-readable storage media of any of examples 11 to 15 or some other example herein, wherein the request is in a Long Term Evolution Positioning Protocol (LPP) message.

Example 17 may include the one or more computer-readable storage media of any of examples 11 to 16 or some other example herein, wherein the indication of a transmission or reception capability of the specified UE is in a ProvideCapabilities Information Element of a Long Term Evolution Positioning Protocol (LPP) message.

Example 18 may include the one or more computer-readable storage media of any of examples 11 to 16 or some other example herein, wherein the indication of a transmission or reception capability of the specified UE is in one of a POSITIONING INFORMATION RESPONSE message of a New Radio Positioning Protocol A (NRPPa) Elementary Procedure (EP) or a POSITIONING INFORMATION UPDATE message of a NRPPa EP.

Example 19 may include the one or more computer-readable storage media of any of examples 11 to 18 or some other example herein, wherein the instructions further include instructions that, when executed by the one or more processors, cause the location server to issue a request for uplink localization positioning measurement. The request may comprise, for example, a request to transmit a sounding reference signal (SRS).

Example 20 may include the one or more computer-readable storage media of any of examples 11 to 19 or some other example herein, wherein the instructions further include instructions that, when executed by the one or more processors, cause the location server to issue a request for downlink localization positioning measurement. The request may comprise, for example, a request for at least one of a reference signal received power (RSRP), a reference signal received quality (RSRQ), and a timing difference.

Example 21 may include a method of operating a location server (e.g., LMF), the method comprising: issuing a request relating to positioning of a specified user equipment (UE); receiving an indication of a transmission or reception capability of the specified UE; and determining, based on the indication of a transmission or reception capability of the specified UE, a list of access nodes for positioning of the specified UE. The indicated transmission or reception capability may correspond, for example, to a distance across which reference signals for positioning measurements may be communicated between the specified UE and an access node.

Example 22 may include the method of example 21 or some other example herein, wherein the request relating to positioning of the UE comprises a request for a position of the UE.

Example 23 may include the method of example 21 or some other example herein, wherein the request relating to positioning of the UE comprises a request for a positioning capability of the UE.

Example 24 may include the method of any of examples 21 to 23 or some other example herein, wherein the transmission or reception capability of the UE comprises a transmission power class of the UE or an indication of a maximum transmit power level.

Example 25 may include the method of any of examples 21 to 24 or some other example herein, wherein the transmission or reception capability of the UE comprises at least one of: a number of transmit antenna elements of the UE; or a number of receive antenna elements of the UE.

Example 26 may include the method of any of examples 21 to 25 or some other example herein, wherein the request is in a Long Term Evolution Positioning Protocol (LPP) message.

Example 27 may include the method of any of examples 21 to 26 or some other example herein, wherein the indication of a transmission or reception capability of the specified UE is in a ProvideCapabilities Information Element of a Long Term Evolution Positioning Protocol (LPP) message.

Example 28 may include the one or more computer-readable storage media of any of examples 21 to 26 or some other example herein, wherein the indication of a transmission or reception capability of the specified UE is in one of a POSITIONING INFORMATION RESPONSE message of a New Radio Positioning Protocol A (NRPPa) Elementary Procedure (EP) or a POSITIONING INFORMATION UPDATE message of a NRPPa EP.

Example 29 may include the location server of any of examples 21 to 28 or some other example herein, wherein the processing circuitry is further to issue a request for uplink localization positioning measurement. The request may comprise, for example, a request to transmit a sounding reference signal (SRS).

Example 30 may include the location server of any of examples 21 to 29 or some other example herein, wherein the processing circuitry is further to issue a request for downlink localization positioning measurement. The request may comprise, for example, a request for at least one of a reference signal received power (RSRP), a reference signal received quality (RSRQ), and a timing difference.

Example 31 may include an apparatus comprising means to perform one or more elements of a method described in or related to any of examples 21 to 30, or any other method or process described herein.

Example 32 may include one or more non-transitory computer-readable media comprising instructions to cause an electronic device, upon execution of the instructions by one or more processors of the electronic device, to perform one or more elements of a method described in or related to any of examples 21 to 30, or any other method or process described herein.

Example 33 may include an apparatus comprising logic, modules, or circuitry to perform one or more elements of a method described in or related to any of examples 21 to 30, or any other method or process described herein.

Example 34 may include a method, technique, or process as described in or related to any of examples 1 to 30, or portions or parts thereof.

Example 35 may include an apparatus comprising: one or more processors and one or more computer-readable media comprising instructions that, when executed by the one or more processors, cause the one or more processors to perform the method, techniques, or process as described in or related to any of examples 21 to 30 or 34, or portions thereof.

Example 36 may include a signal as described in or related to any of examples 1-35, or portions or parts thereof.

Example 37 may include a datagram, information element, packet, frame, segment, PDU, or message as described in or related to any of examples 1-36, or portions or parts thereof, or otherwise described in the present disclosure.

Example 38 may include a signal encoded with data as described in or related to any of examples 1-37, or portions or parts thereof, or otherwise described in the present disclosure.

Example 39 may include a signal encoded with a datagram, TE, packet, frame, segment, PDU, or message as described in or related to any of examples 1-38, or portions or parts thereof, or otherwise described in the present disclosure.

Example 40 may include an electromagnetic signal carrying computer-readable instructions, wherein execution of the computer-readable instructions by one or more processors is to cause the one or more processors to perform the method, techniques, or process as described in or related to any of examples 21 to 30 or 34, or portions thereof.

Example 41 may include a computer program comprising instructions, wherein execution of the program by a processing element is to cause the processing element to carry out the method, techniques, or process as described in or related to any of examples 21 to 30 or 34, or portions thereof.

Example 42 may include a signal in a wireless network as shown and described herein.

Example 43 may include a method of communicating in a wireless network as shown and described herein.

Example 44 may include a system for providing wireless communication as shown and described herein.

Example 45 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A location server comprising:
    a memory having assistance data corresponding to a plurality of access nodes; and
    processing circuitry coupled to the memory, the processing circuitry to:
        issue a request relating to positioning of a specified user equipment (UE);
        receive an indication of a transmission capability of the specified UE with respect to reference signals transmitted for positioning measurements;
        select, based on the indication of the transmission capability, assistance data corresponding to one or more of the plurality of access nodes; and
        provide the selected assistance data to the specified UE.

2. The location server according to claim 1, wherein the transmission capability of the specified UE comprises at least one of: a transmission power class of the specified UE, a maximum transmit power level of the specified UE, or a number of transmit antennas of the specified UE.

3. The location server according to claim 1, wherein the indicated transmission capability corresponds to a distance between the specified UE and an access node at which reference signals may be transmitted for positioning measurements.

4. The location server according to claim 1, wherein the request is in a Long Term Evolution Positioning Protocol (LPP) message.

5. The location server according to claim 1, wherein the indication of the transmission capability of the specified UE is in one of:
    a POSITIONING INFORMATION RESPONSE message of a New Radio Positioning Protocol A (NRPPa) Elementary Procedure (EP); or
    a POSITIONING INFORMATION UPDATE message of a NRPPa EP.

6. The location server according to claim 1, wherein the processing circuitry is further to issue a request for uplink localization positioning measurement, wherein the request for uplink localization positioning measurement comprises a request to transmit a sounding reference signal (SRS).

7. The location server according to claim 1, wherein the processing circuitry is further to issue a request for downlink localization positioning measurement.

8. The location server according to claim 7, wherein the request for downlink localization positioning measurement comprises a request for at least one of:
    a reference signal received power (RSRP),
    a reference signal received quality (RSRQ), or
    a timing difference.

9. One or more non-transitory computer-readable storage media having instructions that, when executed by one or more processors, cause a location server to:
- issue a request relating to positioning of a specified user equipment (UE); and
- receive an indication of a transmission capability of the specified UE,
- determine, based on the indication of the transmission capability of the specified UE, a list of access nodes for positioning of the specified UE,
- wherein the transmission capability of the specified UE comprises at least one of:
  - a transmission power class of the specified UE;
  - a maximum transmit power level of the specified UE; or
  - a number of transmit antennas of the specified UE.

10. The one or more non-transitory computer-readable storage media according to claim 9, wherein the request relating to positioning of the specified UE comprises a request for a position of the specified UE.

11. The one or more non-transitory computer-readable storage media according to claim 9, wherein the request relating to positioning of the specified UE comprises a request for a positioning capability of the specified UE.

12. The one or more non-transitory computer-readable storage media according to claim 9, wherein the indication of the transmission capability of the specified UE is in a ProvideCapabilities Information Element of a Long Term Evolution Positioning Protocol (LPP) message.

13. The one or more non-transitory computer-readable storage media according to claim 9, wherein the request is in a Long Term Evolution Positioning Protocol (LPP) message, and
- wherein the request relating to positioning of the specified UE comprises a request for a positioning capability of the specified UE.

14. The one or more non-transitory computer-readable storage media according to claim 13, wherein the indication of the transmission capability of the specified UE is in one of a POSITIONING INFORMATION RESPONSE message of a New Radio Positioning Protocol A (NRPPa) Elementary Procedure (EP) or a POSITIONING INFORMATION UPDATE message of a NRPPa EP.

15. The one or more non-transitory computer-readable storage media according to claim 9, wherein the instructions, when executed by the one or more processors, further cause the location server to issue a request for uplink localization positioning measurement, wherein the request for uplink localization positioning measurement comprises a request to transmit a sounding reference signal (SRS).

16. The one or more non-transitory computer-readable storage media according to claim 9, wherein the transmission capability of the specified UE comprises the number of transmit antennas of the specified UE.

17. A method of operating a location server, the method comprising:
- issuing a request relating to positioning of a specified user equipment (UE);
- receiving an indication of a transmission capability of the specified UE; and
- determining, based on the indication of the transmission capability of the specified UE, a list of access nodes for positioning of the specified UE,
- wherein the transmission capability of the specified UE comprises at least one of:
  - a transmission power class of the specified UE;
  - a maximum transmit power level of the specified UE; or
  - a number of transmit antennas of the specified UE.

18. The method according to claim 17, wherein the request relating to positioning of the specified UE comprises a request for a positioning capability of the specified UE, and
- wherein the transmission capability of the specified UE comprises the transmission power class of the specified UE or the maximum transmit power level of the specified UE.

19. The method according to claim 17, wherein the request relating to positioning of the specified UE comprises a request for a position of the specified UE, and
- wherein the transmission capability of the specified UE comprises the number of transmit antennas of the specified UE.

20. The method according to claim 19, wherein the method further comprises issuing a request for uplink localization positioning measurement, wherein the request for uplink localization positioning measurement comprises a request to transmit a sounding reference signal (SRS).

* * * * *